UNITED STATES PATENT OFFICE.

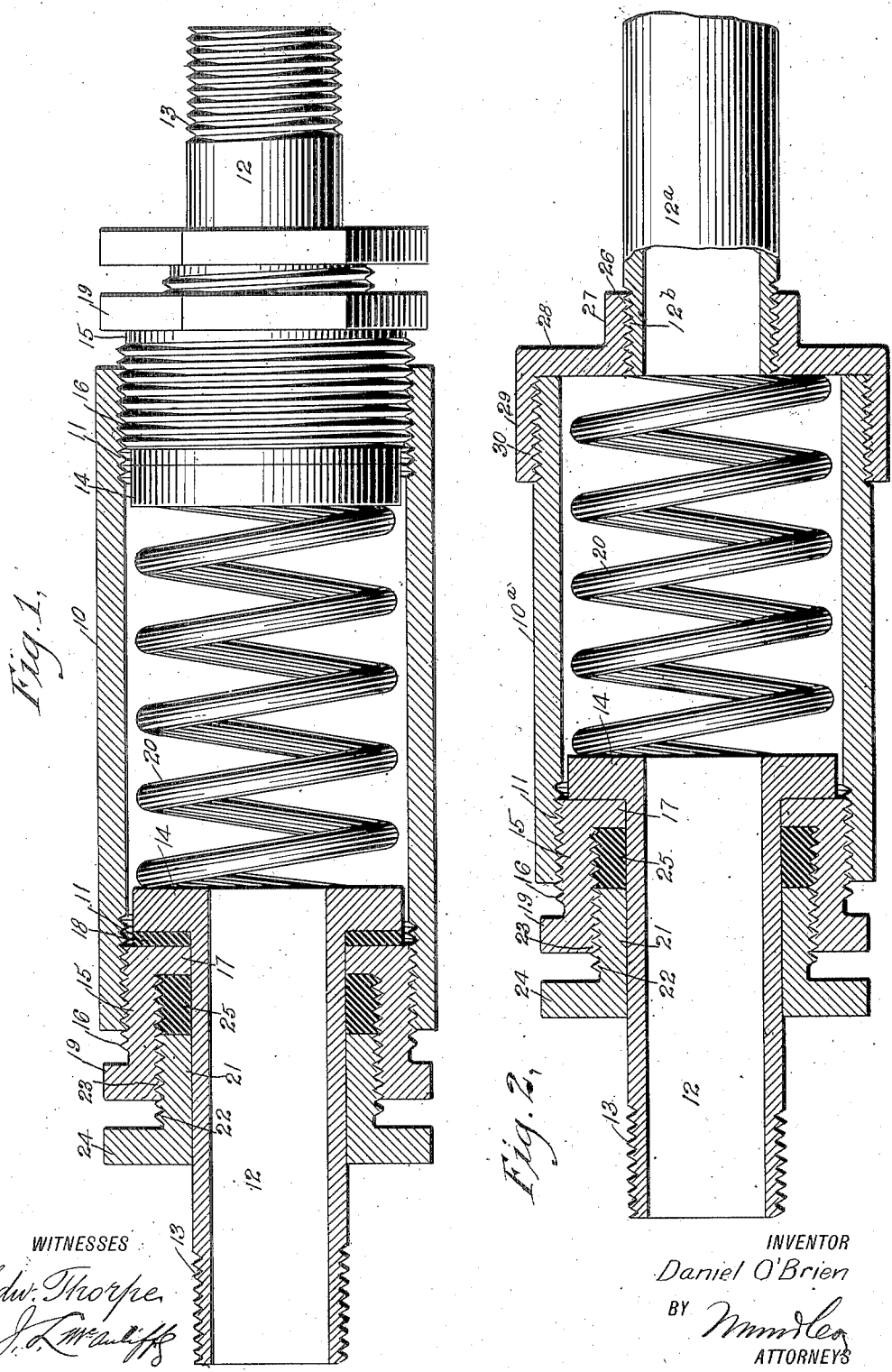

DANIEL O'BRIEN, OF PALESTINE, TEXAS.

SWIVEL-JOINT.

1,303,714.   Specification of Letters Patent.   Patented May 13, 1919.

Application filed June 4, 1918. Serial No. 238,200.

*To all whom it may concern:*

Be it known that I, DANIEL O'BRIEN, a citizen of the United States, and a resident of Palestine, in the county of Anderson and State of Texas, have invented a new and Improved Swivel-Joint, of which the following is a description.

My invention relates to a joint for connecting a pipe or similar element to a coupling sleeve, and more particularly relates to a means to form a swivel joint so that the pipe may be turned about its axis.

My invention has for its general object to provide a swivel joint improved in various particulars, whereby a fluid-tight connection is insured and the packing of the joint may be renewed when desired by the removal of a gland or packing nut without disturbing the remainder of the joint elements.

The means whereby the objects of the invention are obtained will clearly appear from the specific description following.

Reference is to be had to the accompanying drawings forming a part of this specification, it being understood that the drawings are merely illustrative of one example of the invention.

Figure 1 is a partly sectional side elevation of coupled pipe sections showing a practical embodiment of my invention, the invention being applied at both ends of a coupling sleeve;

Fig. 2 is a similar view showing my invention embodied in a coupling at one end of the sleeve.

The different illustrated examples of my invention disclose an expansion spring bearing endwise against the swiveled element, exerting a force axially thereon to maintain it in contact with the stuffing box elements or other packing means so that the swiveled element may turn about its axis while maintaining its contact with the packing or stuffing box members.

My invention as illustrated in Fig. 1 is employed in connection with a coupling sleeve 10 having internal threads 11 at both ends and which threads in practice it will be understood may extend any desired length. The numeral 12 indicates pipe sections at the respective ends of the sleeve 10 and to be joined by the latter. The outer ends of the pipe sections in Fig. 1 are formed with threads 13 for connecting other pipe sections (not shown) or other elements.

The pipe section 12 or like swiveled element extends through a stuffing box made up of elements hereinafter described and is provided with a collar 14 formed upon or suitably secured thereto. An annular follower 15 is formed with external threads 16 engaging the threads 11 on the sleeve 10 and said follower has at the inner end thereof an annular flange 17 projecting radially inward within which flange the pipe section 12 has a sliding fit. Between the flanged inner end of the follower 15 and the collar 14, a packing in the form of a ring 18 may be employed if desired, against which the follower bears at its inner end, as in Fig. 1. Said follower at its outer end has a hexagon or other polygonal flange 19 to take a wrench. Within the sleeve 10 between the respective pipe sections 12 or other elements to be coupled, an expansion spring 20 is accommodated, so that the pressure of the spring will be exerted on the collar 14 of a pipe section 12 or on both pipe sections in the arrangement shown in Fig. 1. The pressure of the spring 20 against the collar 14 tends to press the pipe section 12 outwardly and the collar 14 in the direction of the flange 17 of the follower 15, thereby compressing the packing 18 or in the absence of the packing, serving to form a direct contact between the opposed faces of the said collar 14 and flange 17.

In connection with the follower 15 a gland or packing nut 21 is employed having a sliding fit on the pipe 12 and formed with external threads 22 to engage the internal threads 23 formed on the follower 15. The outer end of the gland 21 has a hexagon or equivalent polygonal flange 24 to take a wrench. Within the follower 15, between the flange 17 thereof and the end of the gland 21, a suitable packing 25 is employed. The turning up of the gland 21 serves to compress the packing 25 and by unscrewing the said gland from the follower, said packing may be renewed at any time leaving a comparatively tight joint between the follower and the pipe section 12 with its collar 14, as well as between said follower and the sleeve 10.

The devices in Fig. 1 are the same at both ends of the coupling sleeve. In Fig. 2, however, a single swivel joint is shown. The parts at the left of the sleeve correspond in all respects with the same elements in Fig. 1 and they accordingly have been given the same reference numbers. The exception, however, is that the packing ring 18 is omitted, so that the spring 20 presses the collar 24 directly against the inner end of the follower 15 and its flange 17, it being understood in practice, that the contact faces are ground to make a tight joint. In Fig. 2, the pipe section 12ª at the right has external threads 12ᵇ instead of a collar 14, said threads being engaged by the internal threads 26 on a nipple 27 formed on a cap 28, said cap having an annular flange 29 internally threaded to engage external threads on the sleeve 10ª as at 30. Thus, pressure of the spring 20 is respectively against the cap 28 and against the collar 14.

The spring 20 in both forms bears against the end of the element 12 to be swiveled, exerting its pressure endwise tending to press the flange of the collar 14 against the opposed members at the outer side thereof.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

A swivel joint for coupling an element to a sleeve, and means including a collar on the inner end of said element within the sleeve, a follower fitting the sleeve and having threaded connection therewith, an annular flange on said follower at its inner end and extending radially inward, to be slidable on said element outward of said collar, an expansion spring in said sleeve to press said collar outwardly in opposition to the flanged inner end of the follower, and a packing within said follower; together with means at the opposite end of said sleeve to connect the same with a pipe against which means the adjacent end of the spring abuts.

DANIEL O'BRIEN.